(12) United States Patent
Nadig

(10) Patent No.: US 10,757,401 B2
(45) Date of Patent: Aug. 25, 2020

(54) DISPLAY SYSTEM AND METHOD FOR DISPLAY CONTROL OF A VIDEO BASED ON DIFFERENT VIEW POSITIONS

(71) Applicant: SONY CORPORATION, Tokyo (JP)

(72) Inventor: Roopa Nadig, Bangalore (IN)

(73) Assignee: SONY CORPORATION, Tokyo (JP)

( * ) Notice: Subject to any disclaimer, the term of this patent is extended or adjusted under 35 U.S.C. 154(b) by 252 days.

(21) Appl. No.: 15/459,888

(22) Filed: Mar. 15, 2017

(65) Prior Publication Data
US 2018/0270467 A1    Sep. 20, 2018

(51) Int. Cl.
| H04N 13/351 | (2018.01) |
| H04N 13/139 | (2018.01) |
| H04N 13/178 | (2018.01) |
| H04N 13/332 | (2018.01) |

(52) U.S. Cl.
CPC ......... *H04N 13/351* (2018.05); *H04N 13/139* (2018.05); *H04N 13/178* (2018.05); *H04N 13/332* (2018.05)

(58) Field of Classification Search
CPC .. H04N 13/139; H04N 13/178; H04N 13/332; H04N 13/351
See application file for complete search history.

(56) References Cited

U.S. PATENT DOCUMENTS

| 6,816,158 | B1 | 11/2004 | Lemelson et al. | |
| 8,488,243 | B2 | 7/2013 | McKnight et al. | |
| 8,890,941 | B2 | 11/2014 | Abeloe | |
| 8,970,681 | B2 | 3/2015 | Son et al. | |
| 2010/0277485 | A1* | 11/2010 | Zalewski | H04N 13/341 345/502 |
| 2011/0023066 | A1* | 1/2011 | Jang | H04N 21/235 725/54 |
| 2012/0026157 | A1* | 2/2012 | Unkel | G09G 3/003 345/419 |
| 2012/0140048 | A1* | 6/2012 | Levine | H04N 21/21805 348/51 |
| 2013/0169755 | A1* | 7/2013 | Choo | H04N 21/4307 348/46 |
| 2013/0215504 | A1* | 8/2013 | Kim | G02B 27/2242 359/464 |

(Continued)

OTHER PUBLICATIONS

"3D Tau Stereo-Step-EclipseTM (SSE)", PR Newswire, Source 1—http://www.prnewswire.com/news-releases/new-3d-tau-technology-provides-3d-viewing-experience-without-special-glasses-30110065.html, Source 2—http://www.3dtau.com/technology/, Jul. 8, 2015.

*Primary Examiner* — Francis Geroleo
(74) *Attorney, Agent, or Firm* — Chip Law Group

(57) ABSTRACT

A display-control apparatus and method for position-based control of display of a video on a display screen are disclosed. Based on retrieval of the video in which each image frame is embedded in one of a plurality of view angles with respect to a reference axis, the display-control apparatus may control display of the video on the display screen. The display controller may control display of the retrieved video on the display screen. The display screen may be viewable from different view positions of a defined area. Further, the display of the retrieved video on the display screen may be controlled such that a first sequence of image frames associated with a first view angle of the plurality of view angles may be viewable through a first type of wearable glasses from a first view position of the different view positions.

19 Claims, 6 Drawing Sheets

(56) References Cited

U.S. PATENT DOCUMENTS

| | | | |
|---|---|---|---|
| 2015/0002643 A1* | 1/2015 | Jung | G02B 27/2285 |
| | | | 348/51 |
| 2015/0049176 A1 | 2/2015 | Hinnen et al. | |
| 2015/0172622 A1* | 6/2015 | Yoon, II | G09G 3/3406 |
| | | | 345/694 |
| 2016/0219268 A1* | 7/2016 | Strom | G06F 3/012 |
| 2016/0261856 A1* | 9/2016 | Ng | H04N 13/366 |
| 2016/0373722 A1* | 12/2016 | Mishra | G06T 1/0028 |
| 2017/0013254 A1* | 1/2017 | Andersson | H04N 21/4316 |

* cited by examiner

DISPLAY SYSTEM AND METHOD FOR DISPLAY CONTROL OF A VIDEO BASED ON DIFFERENT VIEW POSITIONS

CROSS-REFERENCE TO RELATED APPLICATIONS/INCORPORATION BY REFERENCE

None.

FIELD

Various embodiments of the disclosure relate to a display technologies. More specifically, various embodiments of the disclosure relate to a display system and method for display control of a video based on different view positions.

BACKGROUND

Recent advancements in the field of display technologies and video processing have led to the development of various display systems. Typically, in a display system, such as a television or a projector, a video is displayed in a single view angle. For example, a same video is viewed from different view positions of an area, such as a cinema hall. The viewing experience of all audience in the area may not be the same. A user sitting at a certain view position, for example, an extreme corner section in the area, may not have the same viewing experience as compared to a user sitting at other view position, for example, a mid-section of the area. Such conventional display systems not only compromise upon the user experience, but also causes physical or eye strain to the users while viewing the video. Therefore, an improved display system may be desirable to provide enhanced viewing experience and increase user engagement.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A display system and method for display control of a video based on different view positions is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
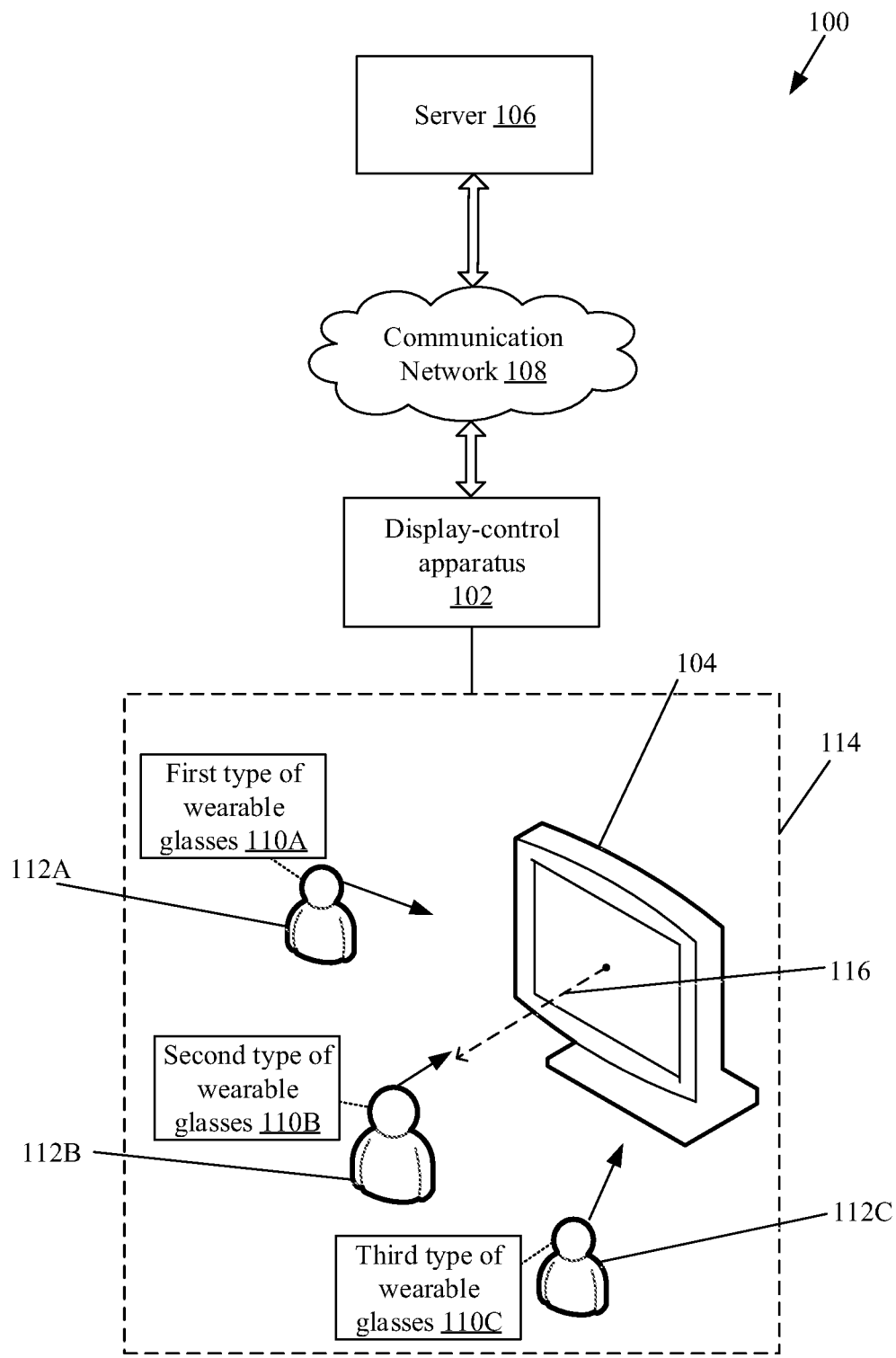
FIG. 1 is a block diagram that illustrates an exemplary network environment for a display system for display control of a video, in accordance with an embodiment of the disclosure.

Various implementations may be found in a display system and method for display control of a video based on different view positions. Exemplary aspects of the disclosure may comprise a method for display control of a video based on different view positions implemented in a display system that includes one or more circuits. The one or more circuits may be configured to retrieve a video in which each image frame is embedded in one of a plurality of view angles with respect to a reference axis. The one or more circuits may be configured to control display of the retrieved video on a display screen. The display screen may be viewable from different view positions of a defined area. Further, the display of the retrieved video on the display screen may be controlled such that a first sequence of image frames may be viewable through a first type of wearable glasses from a first view position of the different view positions. The first sequence of image frames may be associated with a first view angle of the plurality of view angles. The first type of wearable glasses may include a first monochromatic pair of eyewear glasses. The first type of wearable glasses may permit view of the first sequence of image frames associated with the first view angle of the plurality of view angles. The first type of wearable glasses may comprise one of a green pair of eyewear glasses, a blue pair of eyewear glasses, or a red pair of eyewear glasses.

The one or more circuits may be configured to control display of the retrieved video on the display screen such that a second sequence of image frames may be viewable through a second type of wearable glasses from a second view position of the different view positions. The second sequence of image frames may be different from the first sequence of image frames. Further, the second sequence of image frames may be associated with a second view angle of the plurality of view angles. The second type of wearable glasses may be different from the first type of wearable glasses. Further, the second type of wearable glasses may include a second monochromatic pair of eyewear glasses. The second type of wearable glasses may permit view of the second sequence of image frames associated with the second view angle of the plurality of view angles.

The one or more circuits may be configured to control display of the retrieved video on the display screen such that a third sequence of image frames may be viewable through a third type of wearable glasses from a third view position of the different view positions. The third sequence of image frames may be different from the first sequence of image frames and the second sequence of image frames. Further, the third sequence of image frames may be associated with a third view angle of the plurality of view angles. The third type of wearable glasses may be different from the first type of wearable glasses and the second type of wearable glasses. Further, the third type of wearable glasses may include a third monochromatic pair of eyewear glasses. The third type of wearable glasses may permit view of the third sequence of image frames associated with the third view angle of the plurality of view angles.

In accordance with an embodiment, the one or more circuits may be configured to modify a first image frame to generate a first set of modified image frames. Each of the first set of modified image frames may be associated with one of the plurality of view angles. The one or more circuits may be configured to generate the video based on at least the generated first set of modified image frames included in the video. The video may be generated by tagging each of the generated modified image frames, such as the generated first set of modified image frames, with corresponding hex color codes. Hex color codes, such as red, blue, or green hex code, may be stored as a part of metadata associated with the video for the tagging. The one or more circuits may be configured to adjust a frame rate of reproduction of the video by a defined value to control display of the video on the display screen.

FIG. 1 is a block diagram that illustrates an exemplary network environment for a display system that exhibits display control of a video, in accordance with an embodiment of the disclosure. With reference to FIG. 1, there is shown an exemplary network environment 100. The exemplary network environment 100 may include a display-control apparatus 102, a display screen 104, and a server 106. The display-control apparatus 102 may be communicatively coupled to the display screen 104. With reference to FIG. 1, there is further shown a communication network 108, and one or more types of wearable glasses, such as a first type of wearable glasses 110A, a second type of wearable glasses 110B, and a third type of wearable glasses 110C, a plurality of users, such as a first user 112A, a second user 112B, and a third user 112C. The plurality of users may be associated with different types of wearable glasses. For example, the first user 112A, the second user 112B, and the third user 112C may be associated with the first type of wearable glasses 110A, the second type of wearable glasses 110B, and the third type of wearable glasses 110C respectively, as shown. The plurality of users associated with the different types of wearable glasses may view the display screen 104 from different view positions in a defined area 114. There is also shown a reference axis 116. The display-control apparatus 102 and the server 106 may be communicatively coupled with each other, via the communication network 108.

The display-control apparatus 102 may comprise suitable logic, circuitry, interfaces, and/or code that may be configured to control display of a video on the display screen 104 viewable from different view positions of the defined area 114. The video may be retrieved from the server 106, via the communication network 108, or from a memory of the display-control apparatus 102. Examples of the display-control apparatus 102 may include, but are not limited to, a projector, a television, a display device, a gaming console, a personal computer, a laptop computer, a computer workstation, a mainframe computer, a handheld computer, a digital camera, a cellular/mobile telephone, a smart appliance, a digital camcorder (such as a handy-cam), a camera phone, a video player, such as a Blu-ray Disc (BD) player, and/or a DVD writer/player.

The display screen 104 may comprise suitable logic, circuitry, interfaces, and/or code that may be configured to render the video received or projected from the display-control apparatus 102. In accordance with an embodiment, the display screen 104 may be integrated with the display-control apparatus 102. In accordance with another embodiment, the display screen 104 may be a separate unit, such as a projection screen, positioned suitably to render the video projected from the display-control apparatus 102. In accordance with an embodiment, the display screen 104 may be a separate device communicatively coupled to the display-control apparatus 102 to receive the video to be rendered on the display screen 104.

The server 106 may comprise suitable circuitry, interfaces, and/or code that may be configured to store the video. Examples of the server 106 may include, but are not limited to, an application server, a cloud server, a web server, a database server, a file server, a gaming server, a mainframe server, or a combination thereof.

The communication network 108 may include a communication medium through which the display-control apparatus 102 may communicate with the display screen 104 and/or the server 106. The communication network 108 may be a wired or wireless communication channel or network. Examples of the communication network 108 may include, but are not limited to, a Wireless Fidelity (Wi-Fi) network, a Local Area Network (LAN), a wireless personal area network (WPAN), a Wireless Local Area Network (WLAN), a wireless wide area network (WWAN), a cloud network, a Long Term Evolution (LTE) network, a plain old telephone service (POTS), a Metropolitan Area Network (MAN), and/or the Internet. Various devices in the exemplary network environment 100 may be configured to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, Long Term Evolution (LTE), Light Fidelity (Li-Fi), and/or other cellular communication protocols or Bluetooth (BT) communication protocols, including variants thereof.

The different types of wearable glasses, such as the first type of wearable glasses 110A, the second type of wearable glasses 110B, and the third type of wearable glasses 110C, correspond to a monochromatic pair of eyewear glasses. Each type of wearable glasses may refer to one of a green pair of eyewear glasses, a blue pair of eyewear glasses, or a red pair of eyewear glasses. The different types of wearable glasses may permit view of one sequence of image frames associated with one view angle of the plurality of view angles. In accordance with an embodiment, a single smart-glass may be configured to permit view of one sequence of image frames associated with one view angle of the plurality of view angles. The lenses of the smart-glass may be designed such that when viewing in a particular angle, an image that corresponds that particular angle may be reflected and pass through the lenses to enter eyes, whereas images with other angles may not be visible when viewing in that particular angle through the smart-glass. Such smart-glass may also be referred to as angle smart-glass, where one image may be viewed from a particular angle (e.g. −30 to −45 degrees) and another image from another angle (+30 to +45 degrees). For example, three images may be tagged in red, green, and blue hex codes which are to be viewed on the display screen 104. A first image of the three images may be tagged with a red hex code, a second image may be tagged with a blue hex code, and a third image may be tagged with a green hex code. The angle smart-glass may allow only images associated with one view angle and one colored hex code to enter the eyes, while other images with different tagging are filtered out. In accordance with another embodiment, the different types of wearable glasses may have lenses with different polarization that allow only one type of images (e.g. one sequence of image frames associated with one view angle) into the eyes.

In operation, the display-control apparatus 102 may be configured to retrieve a video from the server 106, via the communication network 108. Each image frame in the retrieved video may be embedded in one of a plurality of view angles with respect to a reference axis, such as the reference axis 116. The reference axis 116 may correspond to a line or a plane that may be perpendicular to a surface of the display screen 104 where the video is to be displayed, as shown. The retrieved video may include a plurality of sequences of image frames, for example, a first sequence of image frames, a second sequence of image frames, and a third sequence of image frames. The plurality of sequences of image frames may be associated with the plurality of view angles. For example, the first sequence of image frames, the second sequence of image frames, and the third sequence of image frames may be associated with a first view angle, a second view angle, and a third view angle, respectively. A view angle of the plurality of view angles may correspond to an angle formed by a current position of a user at the time of viewing the display screen 104 with respect to the reference axis 116. For example, the first user 112A, the second user 112B, and the third user 112C may view the display screen 104 from different view positions in the defined area 114. Thus, different view angles may be formed based on a current position of a user at the time of viewing the display screen 104 with respect to the reference axis 116. For example, in a cinema hall, a user sitting in the left-most corner or the right-most corner with respect to a movie display screen, such as the display screen 104, may be at an angle of 45 degree (or a range of 30 degree to 80 degree) with respect to the movie display screen and an exemplary reference axis, such as the reference axis 116. The reference axis 116 in this case may be a straight line extending through the mid-position of the cinema hall perpendicular from a center of the movie display screen. Each image frame in the retrieved video that is to be displayed on the display screen 104 may be associated with one of the different view angles with respect to the reference axis 116. An image frame that is associated with a particular view angle of the plurality of view angles may be suited to be viewed from a certain view position(s) in the defined area 114 that corresponds to that particular view angle (or a range of view angles proximal to the particular view angle).

In a scenario where the retrieved video is independent of image frames with at least two different view angles, the display-control apparatus 102 may be configured to generate the video that comprises the plurality of sequences of image frames. Alternatively stated, it may be checked whether the retrieved video either includes image frames with same or similar content (or in some embodiments different content) but at least associated with two different view angles. In an event, the retrieved video does not include image frames associated with at least two different view angles, the display-control apparatus 102 may process the retrieved video to create a video that comprises the plurality of sequences of image frames, where each sequence of image frames is associated with one view angle. For example, the display-control apparatus 102 may modify a first image frame of the video to generate a first set of modified image frames. The first image frame of the video may be modified by encoding the first image frame, which is associated with a single angle, (for example, the first image frame may be captured in a single angle, such as 90 degree) in different view angles to create multiple images (i.e. the first set of modified image frames), where each image is suitably viewable from one particular view angle of the different view angles. The first set of modified image frames may include same or similar image content. Each of the first set of modified image frames may be associated with one of the plurality of view angles, such as a first view angle, a second view angle, or a third view angle. The first image frame may be modified such that two or more frames are generated, where each generated frame resembles an image frame captured from at least one of the plurality of view angles. Similar to the first image frame, the second image frame, and other consecutive image frames may be modified.

In accordance with an embodiment, each of the generated first set of modified image frames may correspond to different aspect ratio with respect to the first image frame. Alternatively stated, the first image frame may also be modified such that two or more frames are generated, where each generated frame have a specific aspect ratio different from each other. Thus, the display-control apparatus 102 may generate the video that comprises the plurality of sequences of image frames based on the generated plurality of modified image frames. The generation of the video has been described in detail, for example, in FIGS. 2 and 3B.

Based on the retrieved/generated video that includes the plurality of sequences of image frames, the display-control apparatus 102 may control rendering of the video on the display screen 104. The rendered video on the display screen 104 may be viewable from different view positions of the defined area 114, for example, an area within a cinema hall. The rendered video on the display screen 104 may be controlled such that the first sequence of image frames associated with the first view angle may be viewable through the first type of wearable glasses 110A from a first view position of the different view positions. The first type of wearable glasses 110A may include a first monochromatic pair of eyewear glasses that may permit view of the first sequence of image frames associated with the first view angle of the plurality of view angles. The first type of wearable glasses 110A may correspond to one of a green pair of eyewear glasses, a blue pair of eyewear glasses, or a red pair of eyewear glasses. In accordance with another embodiment, the first type of wearable glasses 110A may have lenses with a first polarization that allow only one type of image (e.g. the first sequence of image frames associated with the first view angle) to pass through the lenses with the first polarization into the eyes. For example, the first user 112A associated with the first type of wearable glasses 110A may be able to view the first sequence of image frames associated with the first view angle. In some embodiments, the first type of wearable glasses 110A may correspond to angle smart-glass, where the lenses may be designed such that when viewing in a particular angle, an image that corresponds that particular angle may be reflected and pass through the lenses to enter eyes, whereas images with other angles may not be visible when viewing in that particular angle through the angle smart-glass. In other words, the angle smart-glass may allow only one image associated with one view angle and one colored hex code to enter the eyes, while other images with different tagging are filtered out.

In accordance with an embodiment, the video rendered on the display screen 104 may be further controlled such that the second sequence of image frames associated with the second view angle may be viewable through the second type of wearable glasses 1106 from a second view position of the different view positions. The second type of wearable glasses 110B may include a second monochromatic pair of eyewear glasses that may permit view of the second sequence of image frames associated with the second view angle of the plurality of view angles. The second type of wearable glasses 110B may correspond to one of the green pair of eyewear glasses, the blue pair of eyewear glasses, or the red pair of eyewear glasses. In accordance with another embodiment, the second type of wearable glasses 110B may have lenses with a second polarization (lenses with different polarization as compared to the first type of wearable glasses 110A) that allow only the second sequence of image frames associated with the second view angle to pass through the lenses with the second polarization, into the eyes. For example, the second user 112B associated with the second type of wearable glasses 110B may be able to view the second sequence of image frames associated with the second view angle. In some embodiments, the second type of wearable glasses 110B may correspond to the angle smart-glass that may allow only one image associated with one view angle (e.g. second view angle) and one colored hex code to enter the eyes, while other images with different tagging are filtered out.

In accordance with an embodiment, the rendered video on the display screen 104 may be further controlled such that the third sequence of image frames associated with the third view angle may be viewable through the third type of wearable glasses 110C from a third view position of the different view positions. The third type of wearable glasses 110C may include a third monochromatic pair of eyewear glasses that may permit view of the third sequence of image frames associated with the third view angle of the plurality of view angles. The third type of wearable glasses 110C may correspond to one of the green pair of eyewear glasses, the blue pair of eyewear glasses, or the red pair of eyewear glasses. In accordance with another embodiment, the third type of wearable glasses 110C may have lenses with a third polarization (lenses with different polarization as compared to the first type of wearable glasses 110A and the second type of wearable glasses 110B) that allow only the third sequence of image frames associated with the third view angle to pass through the lenses with the third polarization, into the eyes. For example, the third user 112C associated with the third type of wearable glasses 110C may be able to view the third sequence of image frames associated with the third view angle. In some embodiments, the third type of wearable glasses 110C may correspond to the angle smart-glass that may allow only one image associated with one view angle (e.g. the third view angle) and one colored hex code to enter the eyes, while other images with different tagging are filtered out.

The first type of wearable glasses 110A, the second type of wearable glasses 110B, and the third type of wearable glasses 110C may have different characteristics and/or properties. For example, each of the first type of wearable glasses 110A, the second type of wearable glasses 110B, and the third type of wearable glasses 110C may correspond to a different pair of monochromatic eyewear glasses. For example, the first type of wearable glasses 110A may correspond to the green pair of eyewear glasses, where both the glasses are green for both eye. The second type of wearable glasses 110B and the third type of wearable glasses 110C may correspond to the blue pair of eyewear glasses and the red pair of eyewear glasses, respectively. In some embodiment, the different types of wearable glasses may have lenses with different polarization that allow only one type of images (associated with one view angle) into the eyes. For example, the first type of wearable glasses 110A may have lenses with a first polarization that allow a first type of images into the eyes. Similarly, the second type of wearable glasses 110B may have lenses with a second polarization (different from the first polarization) that allow a second type of images into the eyes. Similarly, the third type of wearable glasses 110C may have lenses with a third polarization (different from the first and second polarization) that allow a third type of images into the eyes. In some embodiments, the first type of wearable glasses 110A, the second type of wearable glasses 110B, and the third type of wearable glasses 110C may refer to the angle smart-glass that may allow only one image associated with one view angle (e.g. either first, or second, or third view angle) and one colored hex code (e.g. a hex code for red color, or the hex code for green color, or the hex code for blue color) to enter the eyes, while other images with different tagging (different hex code tagging) are filtered out.

In accordance with an embodiment, the display-control apparatus 102 may be configured to adjust a frame rate of reproduction of the video by a defined value, to control display of the video on the display screen 104. For example, the frame rate may be increased by "3 times", such as 90 frames per second from 30 frames per second, in case the retrieved/created video includes image frames with three view angles and different tagging of hex codes. Similarly, the frame rate may be increased by "2 times", such as 60 frames per second from 30 frames per second, in case the retrieved/created video includes image frames with two different view angles.

Figure 2:
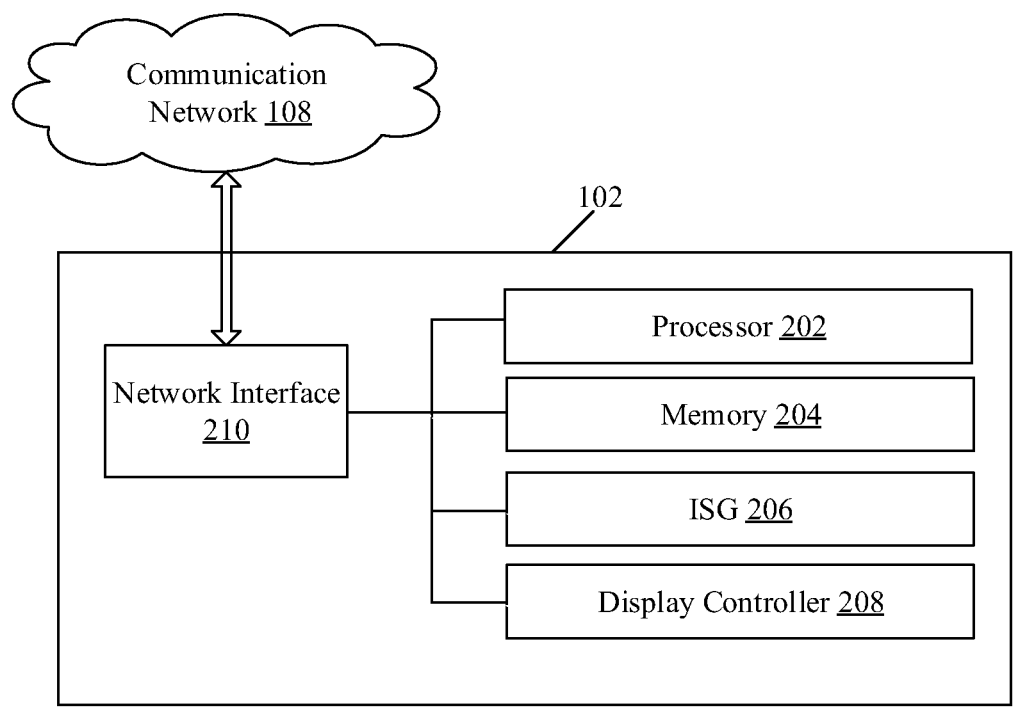
FIG. 2 is a block diagram that illustrates an exemplary display-control apparatus for view position-based display control of a video, in accordance with an embodiment of the disclosure.

FIG. 2 is a block diagram that illustrates an exemplary display-control apparatus for view position-based display control of a video, in accordance with an embodiment of the disclosure. FIG. 2 is explained in conjunction with elements from FIG. 1. With reference to FIG. 2, there is shown a block diagram of an exemplary display-control apparatus, such as the display-control apparatus 102. The display-control apparatus 102 may include one or more circuits, such as a processor 202, a memory 204, an image sequence generator (ISG) 206, and a display controller 208. The display-control apparatus 102 may further include a network interface 210. With reference to FIG. 2, there is further shown the communication network 108 (FIG. 1).

In accordance with an embodiment, the processor 202 may be communicatively coupled to the memory 204, the ISG 206, the display controller 208, and the network interface 210. The network interface 210 may be configured to communicate with the display screen 104 and the server 106, via the communication network 108, under the control of the processor 202.

The processor 202 may comprise suitable logic, circuitry, interfaces, and/or code that may be configured to execute a set of instructions stored in the memory 204. In accordance with an embodiment, the processor 202 may be configured to retrieve a video from the server 106, via the communication network 108. The processor 202 may store the retrieved video in the memory 204. In accordance with an embodiment, the processor 202 may retrieve the video that may be pre-stored from the memory 204. The processor 202 may instruct the ISG 206 and/or the display controller 208 to control display of the video on the display screen 104. The processor 202 may be implemented based on a number of processor technologies, which are known in the art. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processors or control circuits.

The memory 204 may comprise suitable logic, circuitry, interfaces, and/or code that may be configured to store the retrieved video. The memory 204 may be further configured to store a set of instructions executable by the processor 202, the ISG 206, and the display controller 208 to control display of the video on the display screen 104. The memory 204 may be further configured to store operating systems and associated applications of the display-control apparatus 102. Examples of implementation of the memory 204 may include, but are not limited to, Random Access Memory (RAM), Dynamic Random Access Memory (DRAM), Static Random Access Memory (SRAM), Thyristor Random Access Memory (T-RAM), Zero-Capacitor Random Access Memory (Z-RAM), Read Only Memory (ROM), Hard Disk Drive (HDD), a Secure Digital (SD) card, flash drive, cache memory, and/or other non-volatile memory.

The ISG 206 may comprise suitable logic, circuitry, interfaces, and/or code that may be configured to modify a plurality of image frames in the retrieved video to generate a plurality of sequences of image frames. The ISG 206 may be configured to process images of the retrieved video to create a modified video. For example, the ISG 206 may be configured to modify a first image frame of the video to generate a first set of modified image frames. Each of the first set of modified image frames may be associated with one of the plurality of view angles. The ISG 206 may be configured to modify the first image frame of the video by encoding the first image frame in different view angles to generate the first set of modified image frames, where each image is suitably viewable from one particular view angle of the different view angles. The ISG 206 may provide certain depth to the first image frame by encoding such that three images (i.e. the first set of modified image frames) with different view angles are generated. The ISG 206 may be configured to tag each of the generated modified image frames, such as the generated first set of modified image frames, with corresponding hex color codes. Hex color codes, such as red, blue, or green hex code, may be stored as a part of metadata associated with the modified video. Such tagged modified image frames may be embedded one after another in succession to create the modified video. An example of arrangement of different sets of modified image frames is shown and described in FIG. 3B. The ISG 206 may be implemented based on a number of processor technologies, known in the art. Examples of the ISG 206 may be an ASIC processor, a CISC processor, and/or other processors or control circuits. The ISG 206 may be implemented as a separate processor (such as a coprocessor) or special-purpose circuitry in the display-control apparatus 102, as shown. The ISG 206 and the processor 202 may be implemented as an integrated processor or a cluster of processors that perform the functions of the ISG 206 and the processor 202. The ISG 206 may also comprise a set of instructions stored in the memory 204, which on execution by the processor 202 may perform the functions and operations of the ISG 206.

The display controller 208 may comprise suitable logic, circuitry, interfaces, and/or code that may be configured to control display of the plurality of sequences of image frames of the video on the display screen 104. The display of the plurality of sequences of image frames of the video on the display screen 104 may be controlled based on a plurality of view angles associated with the plurality of sequences of image frames. The display controller 208 may be configured to adjust a frame rate of reproduction of the video by a defined value, to control display of the video on the display screen 104. The display controller 208 may be implemented as a separate device or special-purpose circuitry in the display-control apparatus 102, as shown. The display controller 208 and the processor 202 may be implemented as an integrated processor or a cluster of processors that perform the functions of the display controller 208 and the processor 202.

The network interface 210 may comprise suitable logic, circuitry, interfaces, and/or code that may be configured to communicate with the server 106, via the communication network 108 (as shown in FIG. 1). The network interface 210 may be configured to communicate with the display screen 104, via the communication network 108 in case the display screen 104 is a separate device. The network interface 210 may be implemented by application of known technologies to support wired or wireless communication of the display-control apparatus 102 with the communication network 108. Components of the network interface 210 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

In operation, the processor 202 may be configured to retrieve a video from the server 106, via the communication network 108. In some embodiment, the video may be received from an external source device (not shown), via the communication network 108. In some embodiment, the video may be captured by a video-capture device (not shown) integrated with the display-control apparatus 102 in a real time, near-real time, a lag time, or a non-real time. In some embodiment, the video may be extracted from a storage device, such as Hard Disk Drive (HDD), a Secure Digital (SD) card, a digital video disc (DVD), flash drive, cache memory, and/or other non-volatile memory.

Based on the retrieved video, the processor 202 may perform a check to determine whether the retrieved video includes a plurality of sequences of image frames that is associated with a plurality of view angles with respect to a reference axis (e.g. the reference axis 116). The reference axis may correspond to an axis, for example, a plane or a line, with respect to which the plurality of view angles. Each of the plurality of view angles may be associated with different view positions in the defined area 114. The defined area 114 may refer to an enclosed area or an open area where one or more users (e.g. the users 112A, 112B, and 112C) may view the video rendered on the display screen 104 provided in the defined area 114. For example, the one or more users may view a motion-picture show that is displayed on the display screen 104 of a television or a movie theater. In another example, a gaming video may be displayed on the display screen 104 in the defined area 114. The one or more users in a certain view position with respect to the display screen 104 may be involved in a gameplay with other users who may be in a different view position in the defined area 114.

The retrieved video may include the plurality of sequences of image frames, where each image frame in the retrieved video may be embedded in one of the plurality of view angles with respect to the reference axis 116. For example, consider that the retrieved video includes the plurality of sequences of image frames, such as a first sequence of image frames, a second sequence of image frames, and a third sequence of image frames. In such a scenario, each image frame in each of the first sequence of image frames, the second sequence of image frames, and the third sequence of image frames may be associated with one of the plurality of view angles. For example, each of the first sequence of image frames may be associated with a first view angle of the plurality of view angles. Similarly, the second sequence of image frames and the third sequence of image frames may be associated with a second view angle and a third view angle, respectively, of the plurality of view angles.

In certain scenarios, the retrieved video may be independent of the plurality of sequences of image frames. In such scenarios, the processor 202 may communicate an instruction to the ISG 206 to generate the plurality of sequences of image frames in different view angles for the retrieved video. Based on the communicated instruction, the ISG 206 may generate the plurality of sequences of image frames prior to the display of the video on the display screen 104. The ISG 206 may generate the plurality of sequences of image frames based on the plurality of view angles. The ISG 206 may be configured to determine the plurality of view angles prior to the generation of the plurality of sequences of image frames. The plurality of view angles may be determined based on pre-defined settings retrieved from the memory 204. In another embodiment, the plurality of view angles may correspond to angular values provided by the user, for example, an administrator, in real time or near-real time. In yet another embodiment, the ISG 206 may determine the plurality of view angles based on at least real-time image data captured by one or more image-capture device (not shown) that may be integrated with the display-control apparatus 102 and/or the display screen 104. The captured real-time image data may provide an estimate of a total area in front of the display screen 104 of the defined area 114. The estimated area may be divided into view sections in the defined area 114. Based on the plurality of view angles determined by the ISG 206, the plurality of sequences of image frames of the video may be generated. For example, consider that the retrieved video that is independent of the plurality of sequences of image frames, includes a plurality of image frames captured in a single angle. Further, consider that the plurality of view angles to view the display screen 104 in the defined area correspond to the first view angle, the second view angle, and the third view angle. The ISG 206 may be configured to modify a first image frame of the plurality of image frames to generate a first set of modified image frames, for example, a first modified image frame, a second modified image frame, and a third modified image frame. Each of the first set of modified image frames may be associated with one of the first view angle, the second view angle, or the third view angle. The ISG 206 may be configured to modify the first image frame by encoding the first image frame in different view angles to generate the first set of modified image frames, where each image is suitably viewable from one particular view angle of the different view angles. The ISG 206 may be configured to tag each of the generated modified image frames, such as the generated first set of modified image frames, with corresponding hex color codes. The tagged hex color codes, such as red, blue, or green hex code, may be stored as a part of metadata associated with each of the first set of modified image frames. The ISG 206 may also tag each of the generated modified image frames, such as the generated first set of modified image frames, with corresponding angle information, such as first angle, second angle, or third angle. The angle information like the hex color codes may also be stored as a part of metadata associated with the modified image frames.

In some embodiments, each of the generated first set of modified image frames may correspond to different aspect ratio with respect to the first image frame of the plurality of image frames. Similar to the generation of the first set of modified image frames, the ISG 206 may modify each of remaining image frames of the plurality of image frames to generate other sets of modified image frames. Based on the generated sets of modified image frames that corresponds to the plurality of image frames, the ISG 206 may generate the plurality of sequences of image frames. Thereafter, the ISG 206 may embed the first sequence of image frames, the second sequence of image frames, and the third sequence of image frames to generate the video that is to be displayed on the display screen 104. The generated video may be stored in the memory 204.

The ISG 206 may communicate an instruction to the display controller 208, to indicate a presence of the plurality of sequences of image frames, where each of the plurality of sequences of image frames associated with a different view angle, in the video. The display controller 208 may be configured to control the display of the video on the display screen 104. The rendered video on the display screen 104 may be controlled such that the first sequence of image frames associated with the first view angle may be viewable from a first view position of the defined area 114. The one or more users at the first view position, such as a certain section of the defined area 114 may be permitted to view the first sequence of image frames of the video through the first type of wearable glasses 110A. Such display control of the video in which each image frame is embedded in one of a plurality of view angles may permit the users, such as the first user 112A, the second user 112B, and the third user 112C, at the different view positions in the different sections of the defined area 114 to view the video with enhanced viewing experience irrespective of the different view positions.

Figure 3A:
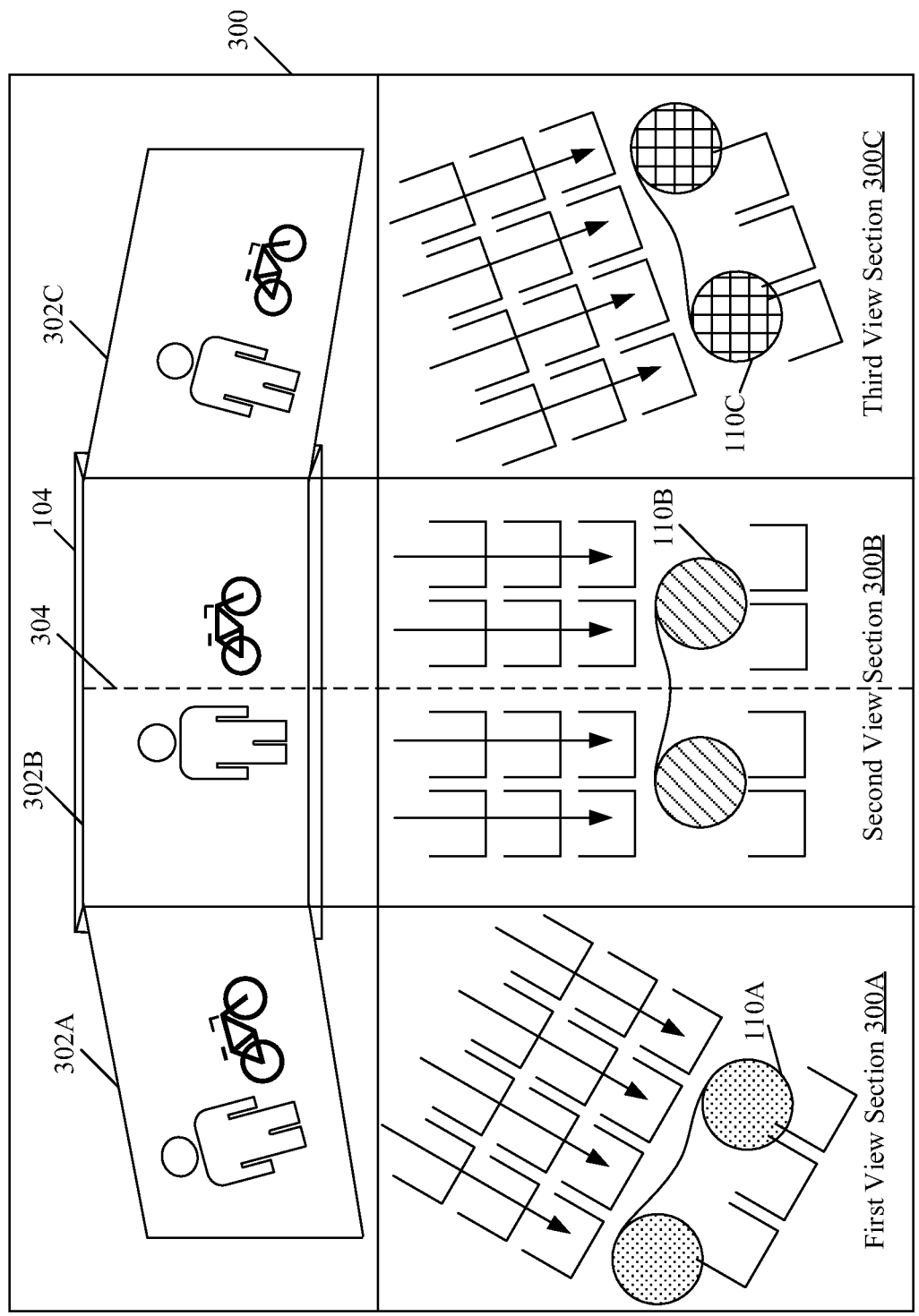
FIG. 3A is a block diagram that illustrates an exemplary scenario for view position-based display control of a video, in accordance with an embodiment of the disclosure.

FIG. 3A is a block diagram that illustrates an exemplary scenario for position-based control of display of a video on a display screen, in accordance with an embodiment of the disclosure. FIG. 3A is described in conjunction with elements from FIG. 1 and FIG. 2. With reference to FIG. 3A, an exemplary defined area, such as a defined area 300, is illustrated. The defined area 300 may correspond to an open area or an enclosed area, for example a cinema hall, that includes different view sections, such as a first view section 300A, a second view section 300B, and a third view section 300C, as shown. The defined area 300 may further include the display screen 104, as shown. There is also shown three image frames, such as a first modified image frame 302A, a second modified image frame 302B, and a third modified image frame 302C, of a video to be displayed on the display screen 104, in which each image frame is embedded in different view angles with respect to a reference axis 304. The first modified image frame 302A, the second modified image frame 302B, and the third modified image frame 302C may correspond to the first set of modified image frames (as described in FIGS. 1 and 2). Each of the first set of modified image frames may be associated with one of a plurality of view angles, such as a first view angle, a second view angle, and a third view angle, with respect to the reference axis 304. The reference axis 304 corresponds to the reference axis 116 (FIG. 1) and refers to a line or a plane that is perpendicular to a plane of the display screen 104. Similar to the first set of modified image frames in which each image frame is embedded in different view angles, the video may include a plurality of sets of modified image frames.

Each of the different view sections 300A, 300B, and 300C may be associated with a specific type of wearable glasses (such as the monochromatic pair of eyewear glasses or the angle smart-glass) that allows one image frame of the three image frames to be viewed through the wearable glasses depending on position of the viewer in the defined area 300. For example, the users sitting in the first view section 300A of the defined area 300 may wear the first type of wearable glasses 110A. The first type of wearable glasses 110A may include a first monochromatic pair of eyewear glasses or the angle smart-glass, which may permit view of image frames, such as the first modified image frame 302A, associated with a first view angle. Other images frames, such as the second modified image frame 302B and the third modified image frame 302C, associated with other view angles, may be filtered out by the first monochromatic pair of eyewear glasses (or the angle smart-glass based on the tagged hex codes and view angle). In some embodiments, the first type of wearable glasses 110A, for example, may correspond to a green pair of eyewear glasses. Similarly, the second view section 300B and the third view section 300C may be associated with a second type of wearable glasses 1106 and a third type of wearable glasses 110C, respectively, as shown. In some embodiments, the first type of wearable glasses 110A, the second type of wearable glasses 1106, and the third type of wearable glasses 110C may correspond to the angle smart-glass that may allow only images associated with one view angle (e.g. either first, or second, or third view angle) and one colored hex code to enter the eyes, while other images with different tagging (for example, hex code tagging) are filtered out.

In accordance with an embodiment, the processor 202 of the display-control apparatus 102 may retrieve the video from the server 106. Each image frame of the video may be embedded in one of the plurality of view angles with respect to the reference axis 304. The display controller 208 may control rendering of the retrieved video on the display screen 104. For example, the display screen 104 may display the first set of modified image frames, such as the first modified image frame 302A, the second modified image frame 302B, and the third modified image frame 302C. Each of the first modified image frame 302A, the second modified image frame 302B, and the third modified image frame 302C may be associated with same media content (visual and audio content). The display controller 208 may further control the display of the first modified image frame 302A, the second modified image frame 302B, and the third modified image frame 302C on the display screen 104. Such display may be controlled to ensure that instead of displaying the same video to all users in the defined area 300, the users in the first view section 300A and the third view section 300C (e.g. corner sections) of the defined area 300, may view and experience the video as it is viewed from the second view section 300B (center section of defined area 300). For example, the first modified image frame 302A associated with the first view angle may be viewable through the first type of wearable glasses 110A from a first view position that corresponds to the first view section 300A of the defined area 300. The first type of wearable glasses 110A may not permit viewing of the second modified image frame 302B and the third modified image frame 302C. Similarly, the second modified image frame 302B associated with the second view angle may be viewable through the second type of wearable glasses 1106 from a second view position that corresponds to the second view section 300B of the defined area 300. The second type of wearable glasses 1106 may include a second monochromatic pair of eyewear glasses or the angle smart-glass that may permit view of those image frames in the video that are associated with the second view angle. For example, the second type of wearable glasses 1106 may comprise a blue pair of eyewear glasses or the angle smart-glass. The second type of wearable glasses 1106 may not permit viewing of the first modified image frame 302A and the third modified image frame 302C for the users seated in the second view section 300B. Similarly, the third modified image frame 302C associated with the third view angle may be viewable through the third type of wearable glasses 110C from a third view position that corresponds to the third view section 300C of the defined area 300. The third type of wearable glasses 110C may include a third monochromatic pair of eyewear glasses or the angle smart-glass that may permit view of those image frames in the video that are associated with the third view angle. For example, the third type of wearable glasses 110C may comprise a red pair of eyewear glasses or the angle smart-glass. The third type of wearable glasses 110C may not permit viewing of the first modified image frame 302A and the second modified image frame 302B for the users seated in the third view section 300C. As the angle of a user seated in the first view section 300A with respect to the reference axis 304 is same or similar to the angle associated with the first modified image frame 302A with respect to the reference axis 304, the user may have same viewing experience as of another user seated in the second view section 300B who is able to view the second modified image frame 302B. Similarly, as the angle of a user seated in the third view section 300C with respect to the reference axis 304 is same or similar to the angle associated with the third modified image frame 302C with respect to the reference axis 304, the user may have same viewing experience as of another user seated in the second view section 300B. Thus, the users sitting at different view positions, for example, extreme corners of the cinema hall and or a mid-section of the cinema hall, may have the same and fair viewing experience.

Figure 3B:
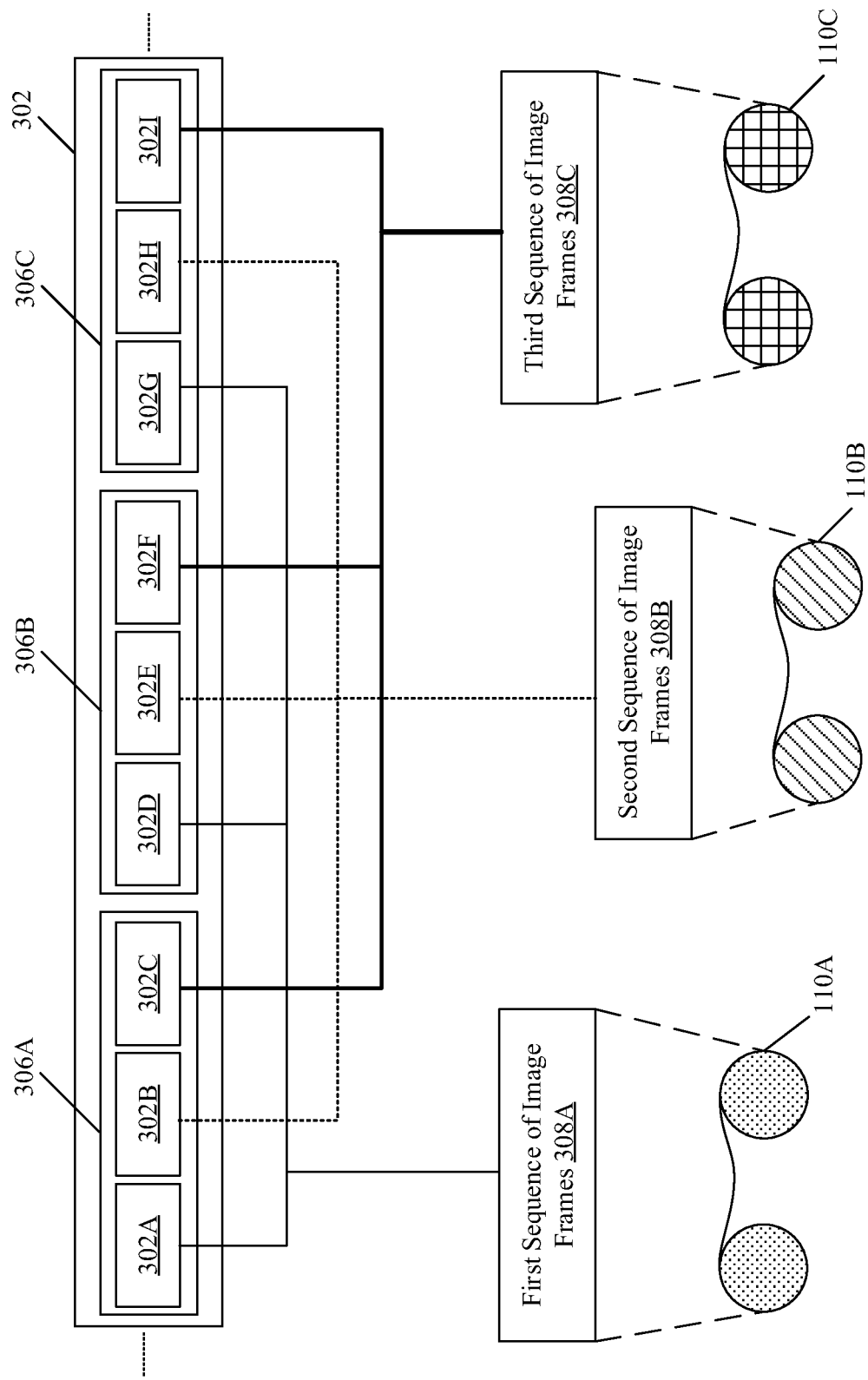
FIG. 3B is a block diagram that illustrates an exemplary sequence of image frames in a video to be displayed on a display screen for view position-based display control of the video, in accordance with an embodiment of the disclosure.

FIG. 3B is a block diagram that illustrates an exemplary sequence of image frames in a video to be displayed on a display screen for view position-based display control of the video, in accordance with an embodiment of the disclosure. FIG. 3B is described in conjunction with elements from FIGS. 1, 2, and 3A. With reference to FIG. 3B, an exemplary video, such as a video 302, is illustrated. The video 302 may include modified image frames 302A to 302I. The modified image frames 302A to 302C may be collectively referred to as a first set of modified image frames 306A. Each of the first set of modified image frames 306A may include same media content. Similarly, the modified image frames 302D to 302F may be collectively referred to as a second set of modified image frames 306B. Further, each of the second set of modified image frames 306B may include same media content. The modified image frames 302G to 302I may be collectively referred to as a third set of modified image frames 306C. Further, each of the third set of modified image frames 306C may include same digital image data. Each image frame in the first set of modified image frames 306A, the second set of modified image frames 306B, and the third set of modified image frames 306C may be associated with one of a plurality of view angles with respect to the reference axis 304 (FIG. 3A). For example, the modified image frames 302A, 302D, and 302G are associated with a first view angle of the plurality of view angles. The modified image frames 302A, 302D, and 302G that are associated with the same view angle (such as the first view angle) may be referred to as a first sequence of image frames 308A. The first sequence of image frames 308A may be viewable through the first type of wearable glasses 110A from a first view position that corresponds to the first view section 300A (FIG. 3A). Similarly, the modified image frames 302B, 302E, and 302H associated with a second view angle of the plurality of view angles, may be referred to as a second sequence of image frames 308B. The second sequence of image frames 308B may be viewable through the second type of wearable glasses 110B from a different view position that corresponds to the second view section 300B (FIG. 3A). Similarly, the modified image frames 302C, 302F, and 302I associated with a third view angle of the plurality of view angles, may be referred to as a third sequence of image frames 308C. The third sequence of image frames 308C may be viewable through the third type of wearable glasses 110C from a third view position that corresponds to the third view section 300C (FIG. 3A).

The display controller 208 may be configured to control rendering of the video 302 on the display screen 104 such that the first sequence of image frames 308A of the video 302 associated with the first view angle may be viewable through the first type of wearable glasses 110A from the first view position. Similarly, the display controller 208 may be configured to control rendering of the video 302 on the display screen 104 such that the second sequence of image frames 308B of the video 302 associated with the second view angle may be viewable through the second type of wearable glasses 110B from the second view position. Similarly, the display controller 208 may be configured to control rendering of the video 302 on the display screen 104 such that the third sequence of image frames 308C of the video 302 associated with the third view angle may be viewable through the third type of wearable glasses 110C from the third view position. The display of the different sequence of image frames may be controlled based on the similar metadata (e.g. all common view angles and common color tag associated with a particular sequence of image frames).

In accordance with another embodiment, the first sequence of image frames 308A associated with the first angle (and/or tagged with metadata (e.g. a particular hex code) that may indicate a first color, such as green) may include image frames of a first video content (e.g. Movie 1). The second sequence of image frames 308B associated with the second angle (and/or tagged with metadata (e.g. a particular hex code) that may indicate a second color, such as blue) may include image frames of a second video content (e.g. Movie 2). The third sequence of image frames 308C associated with the third angle (and/or tagged with metadata (e.g. a particular hex code) that may indicate a third color, such as red) may include image frames of a third video content (e.g. Movie 3). Thus, different video content, for example, different movies (e.g. Movie 1, Movie 2, and Movie 3) may be concurrently played on the display screen 104 as the first sequence of image frames 308A, the second sequence of image frames 308B, and the third sequence of image frames 308C in an exemplary arrangement as shown in FIG. 3B. In such a case, the users seated in the first view section 300A and associated with the first type of wearable glasses 110A may view the first video content, such as the Movie 1. The users seated in the second view section 300B and associated with the second type of wearable glasses 110B may view the second video content, such as the Movie 2. Whereas, the users seated in the third view section 300C and associated with the third type of wearable glasses 110C may view the third video content, such as the Movie 3. Thus, as the different types of wearable glasses 110A, 110B, and 110C permits view of one sequence of image frames associated with one view angle (and/or color or polarization), the users, based on their respective view positions in the defined area 300 and type of wearable glasses worn, may view same content (or different content) of same movie (or different movies) on the same display screen 104. The display controller 208 may be configured to adjust the frame rate by a defined value to control display of the different video content on the display screen 104. For example, the frame rate may be increased by "3 times" (e.g. 90 frames per second) to avoid any overlap among the displayed image frames.

Figure 4A:
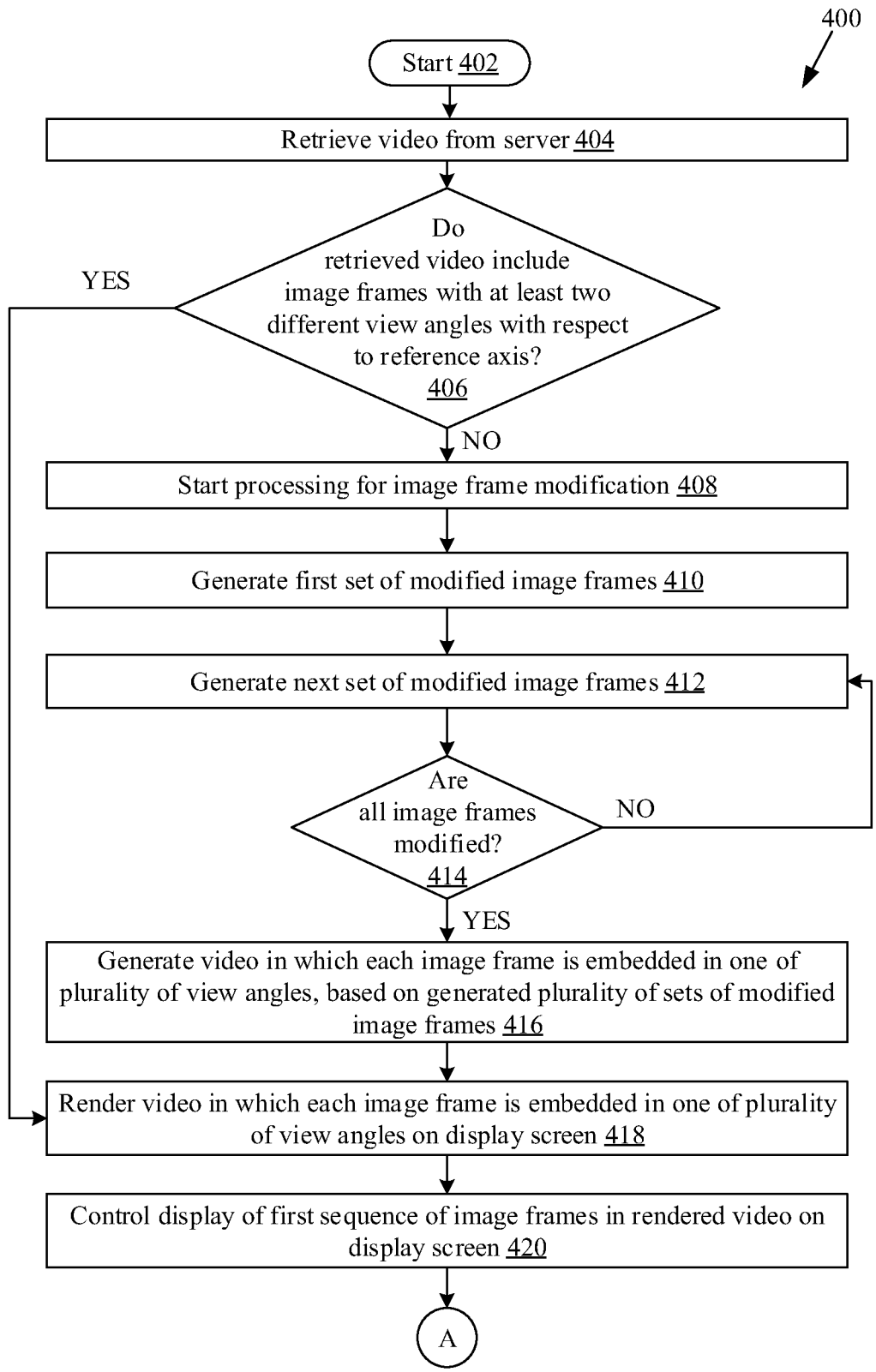
FIGS. 4A and 4B describe a flow chart that illustrates exemplary operations for view position-based display control of a video in the exemplary display-control apparatus of FIG. 2, in accordance with an embodiment of the disclosure.
Figure 4B:
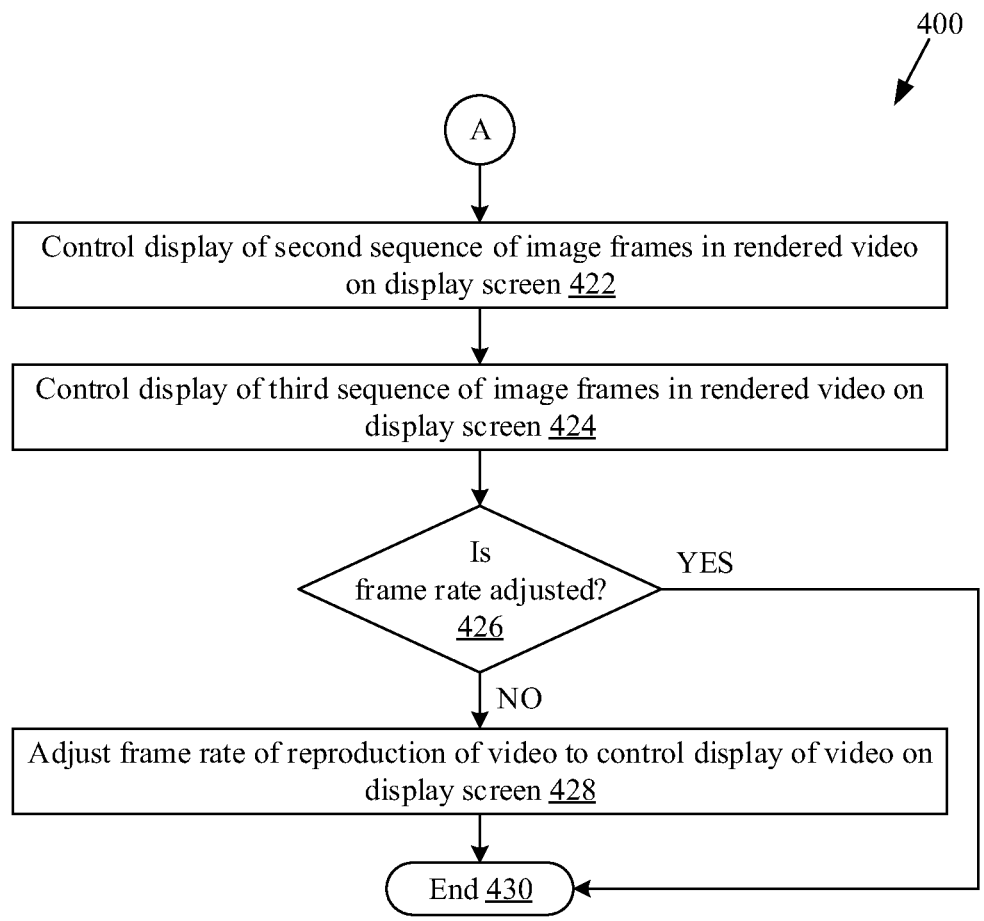

FIGS. 4A and 4B describe a flow chart that illustrates exemplary operations for view position-based display control of a video, in accordance with an embodiment of the disclosure. With reference to FIG. 4A, there is shown flow chart 400. The flow chart 400 is described in conjunction with FIGS. 1, 2, 3A, and 3B. The method starts at 402 and proceeds to 404.

At 404, a video may be retrieved from the server 106, via the communication network 108. The processor 202 may retrieve the video. In another embodiment, the video may be pre-stored in the memory 204. In such a case, the video may be retrieved from the memory 204.

At 406, it may be determined whether the retrieved video includes image frames with at least two different view angles with respect to a reference axis, for example, the reference axis 116. The processor 202 may be configured to perform a check to determine whether the retrieved video includes image frames with at least two different view angles with respect to the reference axis. In instances when the retrieved video includes image frames with at least two different view angles, control passes to 412, else the control passes to 408.

At 408, processing for image frame modification, may be started. The processing for image frame modification may be initiated when the retrieved video does not include image frames with at least two different view angles. At 410, a first set of modified image frames may be generated. The ISG 206 may modify a first image frame of the plurality of image frames of the retrieved video to generate a first set of modified image frames. Each of the generated first set of modified image frames may be associated with one of the plurality of view angles. The ISG 206 may be configured to modify the first image frame of the video by encoding the first image frame in different view angles to generate the first set of modified image frames, where each image is suitably viewable from one particular view angle of the different view angles. The ISG 206 may provide certain depth to the first image frame by encoding such that three images (i.e. the first set of modified image frames) with different view angles are generated. The ISG 206 may then tag each of the generated modified image frames, such as the generated first set of modified image frames, with corresponding hex color codes. Hex color codes, such as red, blue, or green hex code, may be stored as a part of metadata associated with the modified video. The ISG 206 may also tag each of the generated modified image frames, such as the generated first set of modified image frames, with corresponding angle information, such as first angle, second angle, or third angle. The angle information like the hex color codes may also be stored as a part of metadata associated with the modified video. Such tagged modified image frames may be embedded one after another in succession to create the modified video. An example of a set of modified image frames that includes the modified image frames 302A, 302B, and 302C, where each image frame is associated with different view angles, is shown and described in FIG. 3A. Further, in some embodiments, each of the generated first set of modified image frames may have different aspect ratio. In some embodiments, the frame rate value (e.g. 29 frames/second or 30 frames/second) of the retrieved video may also be modified at the time of embedding the tagged modified image frames. The frame rate value of the retrieved video may also be modified based on the angle information, for example, a total number of the plurality of view angles. For example, if the total number of the plurality of view angles is three, the frame rate may be increased "three times" (i.e. 30*3=90 frames/second). The frame rate may be increased by "3 times" to avoid any overlap among image frames during display of the tagged modified image frames (i.e. the modified video). The modified frame rate information may also be stored as the part of metadata associated with the modified video.

At 412, a next set of modified image frames may be generated. Similar to the generation of the first set of modified image frames, other sets of modified image frames may be generated by the ISG 206. At 414, it may be checked whether all image frames of the retrieved video are modified or not. In instances, when one or more image frames of the retrieved video are remaining to be modified, the control pass back to 412, else may pass to 416. Thus, the ISG 206 may be configured to modify each of the plurality of image frames of the retrieved video based on the plurality of view angles. The plurality of image frames (i.e. all image frames) of the retrieved video may be modified to generate a plurality of sets of modified image frames. An example of the plurality of sets of modified image frames, such as the first set of modified image frames 306A, the second set of modified image frames 306B, and the third set of modified image frames 306C, is shown and described in FIG. 3B.

At 416, a video (i.e. a modified video) in which each image frame is embedded in one of the plurality of view angles may be created (or generated), based on at least the plurality of sets of modified image frames. The ISG 206 may arrange a plurality of sequences of image frames, for example, a first sequence of image frames, a second sequence of image frames, and a third sequence of image frames, based on the generated plurality of sets of modified image frames. Each of the plurality of sequence of image frames may be associated with the plurality of view angles. An example of the plurality of sequence of image frames may be the first sequence of image frames 308A, the second sequence of image frames 308B, and the third sequence of image frames 308C associated with the first view angle, the second view angle, and the third view angle, respectively (FIG. 3B). Each image frame in the generated video may be embedded in one of the plurality of view angles.

At 418, the video (i.e. the created video) in which each image frame is embedded in one of the plurality of view angles may be rendered on the display screen 104. The display controller 208 may be configured to read the metadata associated with each modified image frame of the created video for angle information and/or the color tag. The metadata may enable the display controller 208 to distinguish among image frames associated with the first, or the second, or the third view angle. The display controller 208 may then render the video on the display screen 104 based on the read metadata. The rendered video may include the plurality of sequences of image frames, for example, the first sequence of image frames 308A, the second sequence of image frames 308B, and the third sequence of image frames 308C.

At 420, the display of the first sequence of image frames 308A in the rendered video may be controlled on the display screen 104. The display controller 208 may control the display of the first sequence of image frames 308A on the display screen 104. The display of the first sequence of image frames may be controlled such that the first sequence of image frames associated with the first view angle may be viewable from a first view position that corresponds to a first view section (such as the first view section 300A) of the defined area 114. The one or more users in the first view section of the defined area 114 may be permitted to view the first sequence of image frames 308A through the first type of wearable glasses 110A. The first type of wearable glasses 110A may include a first monochromatic pair of eyewear glasses or the angle smart-glass that may permit view of the first sequence of image frames 308A associated with the first view angle. The display of the first sequence of image frames may be controlled based on the similar metadata (e.g. all first view angles and same color tag) associated with the first sequence of image frames.

At 422, the display of the second sequence of image frames 308B in the rendered video may be controlled on the display screen 104. The display controller 208 may control the display of the second sequence of image frames 308B on the display screen 104. The display of the second sequence of image frames 308B may be controlled such that the second sequence of image frames 308B associated with the second view angle may be viewable from a second view position that corresponds to a second view section (such as the second view section 300B) of the defined area 114. The one or more users in the second view section of the defined area 114 may be permitted to view the second sequence of image frames 308B through the second type of wearable glasses 110B. The second type of wearable glasses 110B may include a second monochromatic pair of eyewear glasses or the angle smart-glass that may permit view of the second sequence of image frames 308B associated with the second view angle. The display of the second sequence of image frames may be controlled based on the similar metadata (e.g. all second view angles and common color tag) associated with the second sequence of image frames.

At 424, the display of the third sequence of image frames 308C in the rendered video may be controlled on the display screen 104. The display controller 208 may control the display of the third sequence of image frames 308C on the display screen 104. The display of the third sequence of image frames 308C may be controlled such that the third sequence of image frames 308C associated with the third view angle may be viewable from a third view position that corresponds to a third view section of the defined area. The one or more users in the third view section (such as the third view section 300C) of the defined area 114 may be permitted to view the third sequence of image frames 308C through the third type of wearable glasses 110C. The third type of wearable glasses 110C may include a third monochromatic pair of eyewear glasses or the angle smart-glass that may permit view of the third sequence of image frames 308C associated with the third view angle. The display of the third sequence of image frames may be controlled based on the similar metadata (e.g. all third view angles and common color tag) associated with the third sequence of image frames.

At 426, it may be checked whether a frame rate of reproduction of the video (i.e. the created video with modified image frames) is adjusted to control display of the video on the display screen 104. In instances when the frame rate of reproduction of the video (i.e. the created video with modified image frames) is not adjusted in accordance with the number of view angles or the different tagging of hex codes), the control may pass to 428, else may pass to end 430.

At 428, a frame rate of reproduction of the video may be adjusted to control display of the video on the display screen 104. The display controller 208 may be configured to adjust the frame rate by a defined value to control display of the video on the display screen 104. For example, the frame rate may be increased by "3 times" to avoid any overlap among the displayed image frames. The control passes to the end 430.

In accordance with an embodiment of the disclosure, a display-control apparatus for view position-based display control of a video is disclosed. The display-control apparatus 102 (shown in FIG. 1) may comprise one or more circuits. The one or more circuits may correspond to, for example, the processor 202, the ISG 206, and the display controller 208 (shown in FIG. 2). The one or more circuits may be configured to retrieve the video from the server 106 or the external electronic device. Each image frame in the retrieved video is embedded in one of a plurality of view angles with respect to a reference axis. The display controller 208 may be configured to control display of the retrieved video on the display screen 104. The display screen 104 may be viewable from different view positions of a defined area. Further, the display of the retrieved video on the display screen 104 may be controlled such that a first sequence of image frames associated with a first view angle of the plurality of view angles may be viewable through the first type of wearable glasses 110A from a first view position of the different view positions.

In conventional display systems, when users view a video, for example, in a movie theater, the experience may not be same from different view positions in the movie theater. For example, usually, a first user sitting at a center position (a sweet spot in front of a projector screen) inside the movie theater may get the best video and audio response. A sweet spot for viewing a video on the display screen 104 is usually on the axis (such as the reference axis 116) perpendicular to the display screen 104 passing through the middle of the display screen 104. However, a second user sitting in a corner position inside the movie theater may not experience a good view of the video. Typically, a same video is played for all the audience inside the movie theater irrespective of their positions inside the movie theater. Therefore, users at corner positions may have to stress more than the users at center positions to view the video on the projector screen inside the movie theater. This may cause physical strain to the users while viewing the video. Further, each user inside the movie theater may have different view of the video, which is not desirable. This is why users prefer to sit in the very center (a mid-section of the defined area 114 or the second view section 300B) of the display screen 104 in the middle axis to experience the video from the sweet spot or vicinity of the sweet spot. The mid-section of the defined area 114 best approximates the experience of viewing an actual scene with eyes placed to coincide with angle of the camera lenses when a shot (such as an image in the video) in the video was captured. The same problem of unfair viewing experience across different view positions while viewing a video on a display screen, is observed in televisions, mobile devices, or gaming devices. Therefore, the use of conventional display system not only comprise upon the user experience, but also causes physical strain to the users' eyes. In contrast, the disclosed display-control apparatus, such as the display-control apparatus 102, may utilizes a modified video in which each image frame is embedded in different view angles. The display controller 208 is configured to control display of the video on the display screen 104 such that a specific sequence of image frames associated with a specific view angle of the plurality of view angles may be viewable through one type of wearable glasses. Such control of display of the video on the display screen 104 may permit the users to view the video with reduced stress and discomfort irrespective their positions in the defined area 114. For example, as the angle of a user seated in the first view section 300A with respect to the reference axis 304 is same or similar to the angle associated with the first modified image frame 302A with respect to the reference axis 304, the user may have same viewing experience as of another user seated in the second view section 300B (FIG. 3A). Thus, the users sitting at certain view positions, for example, extreme corners of the cinema hall, may have the same viewing experience as compared to a user sitting at a sweet spot, for example, a mid-section of the cinema hall for enhanced viewing experience. Furthermore, such display control on the display screen 104 may facilitate to concurrently display different videos, for example, three different movies, viewable from the different view positions in the defined area 114. Thereby, wastage of free space inside the defined area 114, such as a movie theater, may be reduced and the profit share and viewing experience may be improved.

Certain conventional display systems, modify the display screen itself, for example, using different layers superimposed on conventional display screen (such as LCD), to create a three-dimensional or stereoscopic effect when users view a video, for example, in a movie theater or a television screen. However, such as modification of display screen is costly and still doesn't provide enhanced viewing experience from different view angles. In contrast, the disclosed display-control apparatus, such as the display-control apparatus 102, utilizes a modified video in which each image frame is embedded in different view angles and doesn't require any hardware changes in the display screen, and thus is cost-effective.

Various embodiments of the disclosure may provide a non-transitory, computer-readable medium and/or storage medium, and/or a non-transitory machine readable medium and/or storage medium stored thereon, a machine code and/or a set of instructions executable by a machine and/or a computer for view position-based display control of a video. The set of instructions may cause the machine and/or computer to perform the steps that comprise retrieving a video in which each image frame is embedded in one of a plurality of view angles with respect to a reference axis. The at least one code section in the display system (e.g., the display-control apparatus 102) may cause the machine and/or computer to perform the operations that comprise controlling display of the retrieved video on a display screen viewable from different view positions of a defined area. The display of the retrieved video on the display screen may be controlled such that a first sequence of image frames associated with a first view angle of the plurality of view angles is viewable through a first type of wearable glasses from a first view position of the different view positions.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A display system, comprising:
one or more circuits configured to:
retrieve a video, wherein
said video comprises a plurality of sequence of image frames, and each sequence of image frames of said plurality of sequence of image frames is associated with a different view angle of a plurality of view angles with respect to a reference axis;
modify an image frame of said retrieved video;
generate a set of modified image frames based on said modification of said image frame;
generate a modified video based on said generated set of modified image frames;
increase a frame rate of reproduction of said modified video by multiplication of said frame rate with a number of said plurality of view angles and based on metadata related to color hex code associated with said plurality of sequence of image frames; and
control display of said modified video on a display screen based on said increased frame rate, wherein said display screen is viewable from a plurality of view positions in an area, wherein
a sequence of image frames of said plurality of sequence of image frames is associated with a view angle of said plurality of view angles and is viewable from a view position of said plurality of view positions based on a type of a wearable glasses associated with said view position.

2. The display system according to claim 1, wherein a first sequence of image frames of said plurality of sequence of image frames is associated with a first view angle of said plurality of view angles and is viewable through a first type of wearable glasses from a first view position of said plurality of view positions, and
said first type of wearable glasses comprises a first monochromatic pair of eyewear glasses that permits view of said first sequence of image frames associated with said first view angle of said plurality of view angles.

3. The display system according to claim 2, wherein a second sequence of image frames of said plurality of sequence of image frames is associated with a second view angle of said plurality of view angles and is viewable through a second type of wearable glasses from a second view position of said plurality of view positions.

4. The display system according to claim 3, wherein said second type of wearable glasses comprises a second monochromatic pair of eyewear glasses that permits view of said second sequence of image frames associated with said second view angle of said plurality of view angles.

5. The display system according to claim 3, wherein a third sequence of image frames of said plurality of sequence of image frames is associated with a third view angle of said plurality of view angles and is viewable through a third type of wearable glasses from a third view position of said plurality of view positions.

6. The display system according to claim 5, wherein said third type of wearable glasses comprises a third monochromatic pair of eyewear glasses that permits view of said third sequence of image frames associated with said third view angle of said plurality of view angles.

7. The display system according to claim 2, wherein said first type of wearable glasses comprises one of a green pair of eyewear glasses, a blue pair of eyewear glasses, or a red pair of eyewear glasses.

8. The display system according to claim 1, wherein each modified image frame of said set of modified image frames is associated with one of said plurality of view angles.

9. The display system according to claim 1, wherein said one or more circuits are further configured to generate each of said set of modified image frames having a different aspect ratio.

10. The display system according to claim 1, wherein
a first sequence of image frames of said plurality of sequence of image frames is associated with a first view angle of said plurality of view angles and is viewable through a first type of wearable glasses from a first view position of said plurality of view positions, and
said first type of wearable glasses corresponds to a smart-glass that permits view of said first sequence of image frames associated with said first view angle.

11. The display system according to claim 1, wherein
said type of said wearable glasses corresponds to a smart-glass that permits view of said sequence of image frames,
said sequence of image frames is associated with said view angle and a hex code viewable from said view position, and
said hex code is stored as metadata associated with said sequence of image frames.

12. The display system according to claim 1, wherein said one or more circuits are further configured to
concurrently play a first video content, a second video content and a third video content on said display screen, wherein said first video content, said second video content, and said third video content are viewable on said display screen at a same time from said plurality of view positions.

13. A display method, comprising:
retrieving, by one or more circuits, a video, wherein
said video comprises a plurality of sequence of image frames, and each sequence of image frames of said plurality of sequence of image frames is associated with a different view angle of a plurality of view angles with respect to a reference axis;
modifying, by said one or more circuits, an image frame of said retrieved video
generating, by said one or more circuits, a set of modified image frames based on said modification of said image frame;

generating, by said one or more circuits, a modified video based on said generated set of modified image frames;

increasing, by said one or more circuits, a frame rate of reproduction of said modified video by multiplication of said frame rate with a number of said plurality of view angles and based on metadata related to color hex code associated with said plurality of sequence image frames; and controlling, by said one or more circuits, display of said modified video on a display screen based on said increased frame rate, wherein said display screen k viewable from a plurality of view positions in an area, wherein a sequence of image frames of said plurality of sequence of image frames k associated with a view angle of said plurality of view angles and is viewable from a view position of said plurality of view positions based on a type of a wearable glasses associated with said view position.

14. The display method according to claim 13, wherein a first sequence of image frames of said plurality of sequence of image frames is associated with a first view angle of said plurality of view angles and is viewable through a first type of wearable glasses from a first view position of said plurality of view positions, and said first type of wearable glasses comprises a first monochromatic pair of eyewear glasses that permits view of said first sequence of image frames associated with said first view angle of said plurality of view angles.

15. The display method according to claim 14, wherein a second sequence of image frames of said plurality of sequence of image frames is associated with a second view angle of said plurality of view angles and is viewable through a second type of wearable glasses from a second view position of said plurality of view positions.

16. The display method according to claim 15, wherein said second type of wearable glasses comprises a second monochromatic pair of eyewear glasses that permits view of said second sequence of image frames associated with said second view angle of said plurality of view angles.

17. The display method according to claim 14, wherein a third sequence of image frames of said plurality of sequence of image frames is associated with a third view angle of said plurality of view angles and is viewable through a third type of wearable glasses from a third view position of said plurality of view positions.

18. The display method according to claim 17, wherein said third type of wearable glasses comprises a third monochromatic pair of eyewear glasses that permits view of said third sequence of image frames associated with said third view angle of said plurality of view angles.

19. The display method according to claim 13, wherein each modified image frame of said set of modified image frames is associated with one of said plurality of view angles.

* * * * *